(12) United States Patent
Scott et al.

(10) Patent No.: US 10,801,367 B2
(45) Date of Patent: *Oct. 13, 2020

(54) CASE COUPLING AND ASSEMBLY

(71) Applicant: United Technologies Corporation, Farmington, CT (US)

(72) Inventors: Jonathan A. Scott, Southington, CT (US); Darren M. Smith, Andover, CT (US)

(73) Assignee: Raytheon Technologies Corporation, Farmington, CT (US)

(*) Notice: Subject to any disclaimer, the term of this patent is extended or adjusted under 35 U.S.C. 154(b) by 138 days.

This patent is subject to a terminal disclaimer.

(21) Appl. No.: 16/110,710

(22) Filed: Aug. 23, 2018

(65) Prior Publication Data

US 2019/0010826 A1    Jan. 10, 2019

Related U.S. Application Data

(62) Division of application No. 14/746,322, filed on Jun. 22, 2015, now Pat. No. 10,082,042.

(51) Int. Cl.
*F01D 25/24* (2006.01)
*F01D 21/00* (2006.01)
(Continued)

(52) U.S. Cl.
CPC .......... *F01D 25/243* (2013.01); *F01D 21/003* (2013.01); *F01D 25/285* (2013.01);
(Continued)

(58) Field of Classification Search
CPC ...... F01D 25/24; F01D 25/243; F01D 25/285; F05D 2250/281; F05D 2230/30; F05D 2230/64; F05D 2230/642; F05D 2230/644; F05D 2230/68; F04D 29/40; F04D 29/403; F04D 29/406; F04D 29/52; F04D 29/522;
(Continued)

(56) References Cited

U.S. PATENT DOCUMENTS 940,098 A * 11/1909 Wehrle .................. F16L 21/04
                                                                285/372
1,781,091 A    11/1930 Wilson
(Continued)

FOREIGN PATENT DOCUMENTS

FR          1165590 A * 10/1958 ........... F01D 25/243

OTHER PUBLICATIONS

Pruftechnik Ltd, "A Practical Guide to Shaft Alignment", Edition 4;4-03.007, available from https://www.plantservices.com/assets/knowledge_centers/ludeca/assets/A_Practical_Guide_to_Shaft_Alignment.pdf (Year: 2002).*

*Primary Examiner* — Michael Lebentritt
*Assistant Examiner* — Topaz L. Elliot
(74) *Attorney, Agent, or Firm* — Getz Balich LLC

(57) ABSTRACT

A system and method for coupling cases associated with an engine of an aircraft. A first case includes a first plurality of threads. A second case includes a second plurality of threads. A coupler includes a third plurality of threads and a fourth plurality of threads. An interface is configured to align the first case and the second case before the first plurality of threads engage the third plurality of threads or the second plurality of threads engage the fourth plurality of threads.

8 Claims, 10 Drawing Sheets

(51) Int. Cl.
*F02K 1/80* (2006.01)
*F01D 25/28* (2006.01)

(52) U.S. Cl.
CPC ............ *F02K 1/80* (2013.01); *F05D 2220/32* (2013.01); *F05D 2230/60* (2013.01); *F05D 2230/64* (2013.01); *F05D 2250/281* (2013.01); *F05D 2260/30* (2013.01); *Y02T 50/671* (2013.01)

(58) Field of Classification Search
CPC .. F04D 29/528; F02K 1/80; F16L 1/10; F16L 13/168; F16L 15/00; F16L 15/001; F16L 15/002; F16L 15/006; F16L 15/02; F16L 15/06; F16L 15/08
USPC .......................................................... 285/333
See application file for complete search history.

(56) References Cited

U.S. PATENT DOCUMENTS

| | | | |
|---|---|---|---|
| 1,936,573 A | 11/1933 | Anger | |
| 2,821,094 A | 1/1958 | Ericson | |
| 3,014,741 A | 12/1961 | McDowall | |
| 3,185,854 A | 5/1965 | Hoffman | |
| 3,252,192 A * | 5/1966 | Smith ....................... | F16L 1/10 269/117 |
| 4,222,174 A * | 9/1980 | Hauk ..................... | E21B 19/16 33/199 R |
| 4,531,694 A | 7/1985 | Soloy | |
| 4,635,970 A * | 1/1987 | Haines .................... | F16L 21/08 285/114 |
| 5,004,017 A * | 4/1991 | White ....................... | F16L 1/26 138/106 |
| 5,040,827 A | 8/1991 | DeLange | |
| 5,048,871 A | 9/1991 | Pfeiffer et al. | |
| 5,714,062 A | 2/1998 | Winkler et al. | |
| 5,737,913 A | 4/1998 | Terry | |
| 6,336,790 B1 | 1/2002 | Jacobsson | |
| 6,499,221 B1 | 12/2002 | Kuhn | |
| 6,578,876 B2 | 6/2003 | Guertin, Jr. | |
| 6,775,890 B2 * | 8/2004 | Kolarik .................. | B25B 27/10 285/114 |
| 6,908,121 B2 | 6/2005 | Hirth et al. | |
| 7,226,090 B2 | 6/2007 | Hughes | |
| 7,578,164 B2 | 8/2009 | Sherlock | |
| 8,029,026 B2 | 10/2011 | Stolle et al. | |
| 8,070,190 B2 * | 12/2011 | Pires Cabado ......... | F16L 27/12 285/373 |
| 8,142,150 B2 | 3/2012 | Frick et al. | |
| 8,215,919 B2 | 7/2012 | Jewess | |
| 8,689,455 B2 | 4/2014 | Smith | |
| 8,950,724 B2 | 2/2015 | Hurst | |
| 9,527,173 B2 * | 12/2016 | Edwards ................. | B23P 19/10 |
| 9,593,595 B2 | 3/2017 | Nava et al. | |
| 9,808,893 B2 * | 11/2017 | McClure ............ | B23K 37/0533 |
| 10,253,650 B2 * | 4/2019 | Muller ...................... | F23R 3/60 |
| 2003/0122373 A1 | 7/2003 | Hirth et al. | |
| 2006/0267342 A1 | 11/2006 | Boyd | |
| 2011/0031020 A1 | 2/2011 | Cote | |
| 2012/0099975 A1 | 4/2012 | Robertson, Jr. et al. | |
| 2013/0042630 A1 | 2/2013 | Muldoon | |
| 2014/0053573 A1 | 2/2014 | Josefczyk et al. | |
| 2014/0161593 A1 | 6/2014 | Ruberte Sanchez et al. | |
| 2015/0098816 A1 | 4/2015 | Longtin | |
| 2016/0238048 A1 | 8/2016 | Halabi | |
| 2016/0263715 A1 | 9/2016 | Gerber et al. | |
| 2016/0298492 A1 | 10/2016 | Smith et al. | |
| 2016/0341214 A1 | 11/2016 | O'Toole et al. | |
| 2017/0008646 A1 * | 1/2017 | Nestleroad ............... | B64F 5/10 |

\* cited by examiner

CASE COUPLING AND ASSEMBLY

This application claims priority to and is a divisional of U.S. patent application Ser. No. 14/746,322 filed Jun. 22, 2015. The '322 application is hereby incorporated herein by reference in its entirety.

BACKGROUND

In association with a conventional aircraft engine assembly, a case of an aircraft engine may utilize a bolted flange. The flange may be subjected to high thermal gradients or stress, particularly in the hottest portions of the engine. In some instances, the stress can cause the flange to bend or crack. A cracked flange can cause the engine to be removed from a wing of the aircraft prematurely.

Case clocking can also cause the case to be out of alignment. As a result, bolts that are used are manufactured to tight tolerances to prevent such clocking from occurring. Manufacturing to such tight tolerances increases the cost of the bolts.

Furthermore, bracket attachment mechanisms frequently require the use of bolts of different lengths in different locations. Such configurations increase the likelihood of human/operator error during engine assembly or repair and imposes additional cost in terms of ensuring against an improper bolt being installed at a given location.

BRIEF SUMMARY

The following presents a simplified summary in order to provide a basic understanding of some aspects of the disclosure. The summary is not an extensive overview of the disclosure. It is neither intended to identify key or critical elements of the disclosure nor to delineate the scope of the disclosure. The following summary merely presents some concepts of the disclosure in a simplified form as a prelude to the description below.

Aspects of the disclosure are directed to a system for coupling cases associated with an engine of an aircraft, comprising a first case including a first plurality of threads, a second case including a second plurality of threads, a coupler including a third plurality of threads and a fourth plurality of threads, and an interface configured to align the first case and the second case before the first plurality of threads engage the third plurality of threads or the second plurality of threads engage the fourth plurality of threads. In some embodiments, the interface comprises a pin associated with the first case that is configured to mate with a corresponding hole in the second case. In some embodiments, the interface comprises a plurality of teeth associated with the first case, and a region of the first case denoted by an absence of teeth. In some embodiments, the interface comprises a second tooth associated with the second case that is configured to mesh with the region of the first case. In some embodiments, the second tooth is of a substantially different size from each of the plurality of teeth associated with the first case. In some embodiments, the interface comprises a first bracket coupled to the first case, a second bracket coupled to the second case, and a pin that is configured to be received by the first bracket and the second bracket. In some embodiments, the system further comprises a third bracket coupled to the first case, a fourth bracket coupled to the second case, and a second pin that is configured to be received by the third bracket and the fourth bracket. In some embodiments, the system further comprises a gauge associated with the second pin and configured to measure a depth.

In some embodiments, the first bracket and the third bracket are integrally formed. In some embodiments, the second bracket and the fourth bracket are integrally formed.

Aspects of the disclosure are directed to a method for coupling cases associated with an engine of an aircraft, comprising joining a first bracket with a first case and a second bracket with a second case, threading an alignment pin into the second bracket, bringing the first case and the second case together until contact is made with threads of a coupler, where the contact occurs subsequent to an engagement of the alignment pin with the first bracket, and applying torque to the coupler to cause the first case to couple to the second case. In some embodiments, the method further comprises unthreading and removing the alignment pin from the first bracket and the second bracket subsequent to applying the torque, and removing the first bracket from the first case and the second bracket from the second case subsequent to the removal of the alignment pin. In some embodiments, the joining of the first bracket with the first case includes bolting the first bracket to the first case. In some embodiments, the method further comprises joining a third bracket with the first case and a fourth bracket with the second case, and threading a depth pin into the fourth bracket. In some embodiments, the method further comprises threading a gauge into the third bracket. In some embodiments, the method further comprises adjusting the gauge to contact the depth pin, and recording a reading associated with a depth based on the adjustment of the gauge. In some embodiments, the method further comprises pulling apart the first case and the second case, and turning the gauge to account for a width of the coupler. In some embodiments, the applied torque is based on the recorded reading.

BRIEF DESCRIPTION OF THE DRAWINGS

The present disclosure is illustrated by way of example and not limited in the accompanying figures in which like reference numerals indicate similar elements.

DETAILED DESCRIPTION

In accordance with various aspects of the disclosure, apparatuses, systems and methods are described for reducing/minimizing stress experienced by one or more components or devices associated with a case of an engine. In accordance with aspects of the disclosure, techniques for aligning cases and applying torque to a coupler are described.

Figure 1:
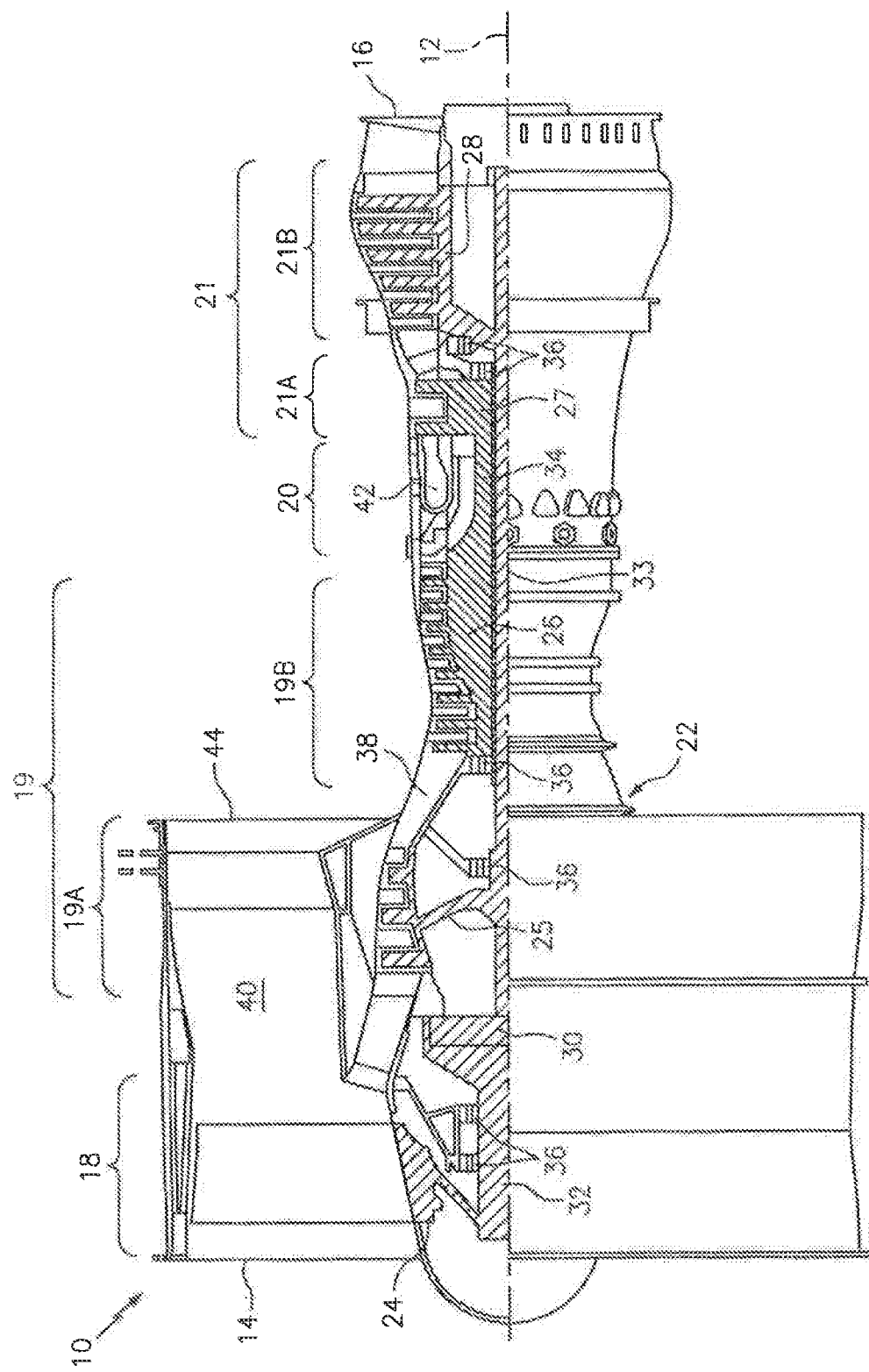
FIG. 1 is a side cutaway illustration of a geared turbine engine.

Aspects of the disclosure may be applied in connection with a gas turbine engine. FIG. 1 is a side cutaway illustration of a geared turbine engine 10. This turbine engine 10 extends along an axial centerline 12 between an upstream airflow inlet 14 and a downstream airflow exhaust 16. The turbine engine 10 includes a fan section 18, a compressor section 19, a combustor section 20 and a turbine section 21. The compressor section 19 includes a low pressure compressor (LPC) section 19A and a high pressure compressor (HPC) section 19B. The turbine section 21 includes a high pressure turbine (HPT) section 21A and a low pressure turbine (LPT) section 21B.

The engine sections 18-21 are arranged sequentially along the centerline 12 within an engine housing 22. Each of the engine sections 18-19B, 21A and 21B includes a respective rotor 24-28. Each of these rotors 24-28 includes a plurality of rotor blades arranged circumferentially around and connected to one or more respective rotor disks. The rotor blades, for example, may be formed integral with or mechanically fastened, welded, brazed, adhered and/or otherwise attached to the respective rotor disk(s).

The fan rotor 24 is connected to a gear train 30, for example, through a fan shaft 32. The gear train 30 and the LPC rotor 25 are connected to and driven by the LPT rotor 28 through a low speed shaft 33. The HPC rotor 26 is connected to and driven by the HPT rotor 27 through a high speed shaft 34. The shafts 32-34 are rotatably supported by a plurality of bearings 36; e.g., rolling element and/or thrust bearings. Each of these bearings 36 is connected to the engine housing 22 by at least one stationary structure such as, for example, an annular support strut.

During operation, air enters the turbine engine 10 through the airflow inlet 14, and is directed through the fan section 18 and into a core gas path 38 and a bypass gas path 40. The air within the core gas path 38 may be referred to as "core air". The air within the bypass gas path 40 may be referred to as "bypass air". The core air is directed through the engine sections 19-21, and exits the turbine engine 10 through the airflow exhaust 16 to provide forward engine thrust. Within the combustor section 20, fuel is injected into a combustion chamber 42 and mixed with compressed core air. This fuel-core air mixture is ignited to power the turbine engine 10. The bypass air is directed through the bypass gas path 40 and out of the turbine engine 10 through a bypass nozzle 44 to provide additional forward engine thrust. This additional forward engine thrust may account for a majority (e.g., more than 70 percent) of total engine thrust. Alternatively, at least some of the bypass air may be directed out of the turbine engine 10 through a thrust reverser to provide reverse engine thrust.

FIG. 1 represents one possible configuration for an engine 10. Aspects of the disclosure may be applied in connection with other environments, including additional configurations for an engine of an aircraft.

Figure 2:
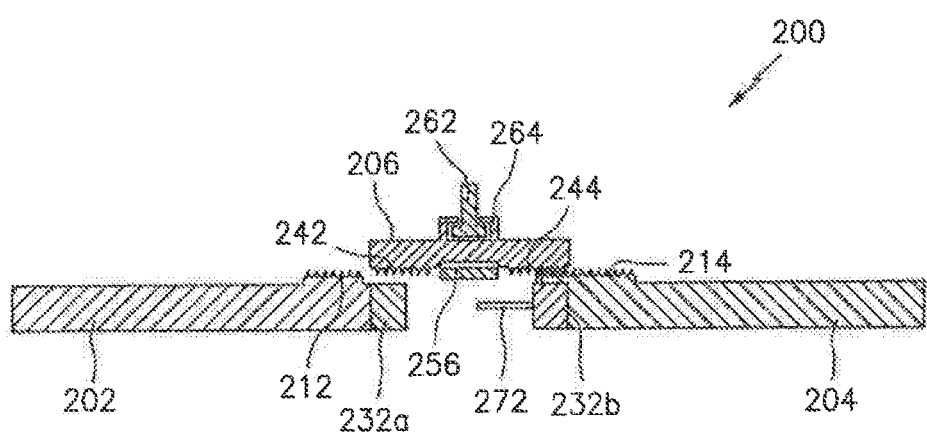
FIG. 2 illustrates a system for coupling cases together based on the use of one or more pins configured to mesh/mate with one or more corresponding holes/recesses.

Referring to FIG. 2, a system 200 is shown. The system 200 may be used to couple a first case 202 and a second case 204 to one another. One or both of the cases 202 and 204 may be associated with ducts, a turbine (e.g., turbine sections 21A and 21B), etc. One or both of the cases 202 and 204 may be circular cases.

The cases 202 and 204 may be coupled to one another via a nut 206. The nut 206 may correspond to a "turnbuckle nut" as would be appreciated by one of skill in the art based on a review of this disclosure.

As shown in FIG. 2, the first case 202 and a first portion of the nut 206 may include threads oriented in a first direction (e.g., oriented as left hand threads) as denoted via reference characters 212 and 242, respectively. The second case 204 and a second portion of the nut 206 may include threads oriented in a second direction (e.g., oriented as right hand threads) as denoted via reference characters 214 and 244, respectively. The threads 212 may be configured to mate with, or engage, the threads 242. The threads 214 may be configured to mate with, or engage, the threads 244.

As shown in FIG. 2, the system 200 may include an insulation ring 256. The insulation ring 256 may isolate, e.g., the nut 206 from hot air associated with the operation of the engine. The insulation ring 256 may be made of one or more materials, such as for example a metallic material, a woven ceramic, etc.

The system 200 may include a (bracket T-head) bolt 262 and associated bracket bolt rail 264. The bolt 262 and rail 264 are exemplary of a mechanism that may be configured to attach the system 200 (or a portion thereof—e.g., the nut 206) to, e.g., a bracket.

FIG. 2 illustrates the system 200 (e.g., the cases 202 and 204) in an uncoupled state. The system 200 may be placed in a coupled state where the cases 202 and 204 are pulled together by turning/rotating the nut 206 to engage the threads 212 and 214 with their counterpart threads 242 and 244, respectively. Examples of cases being placed into a coupled state with one another are described in U.S. patent application Ser. No. 14/685,144, filed Apr. 13, 2015, and entitled "Turbine Case Coupling", the contents of which are incorporated herein by reference.

One or both of the cases 202 and 204 may include, or be associated with, an interface, such as for example interfaces 232a and 232b. The interfaces 232a and 232b may be used for purposes of, or may be configured to provide, anti-rotation, alignment, or support with respect to one or more of the case 202, the case 204, or the nut 206. The interfaces 232a and 232b may be characterized by, or include, a castellated structure, studs and holes, a curvic-type interface, etc.

As shown in FIG. 2, the interface 232b may include, or be associated with, one or more pins (denoted by reference character 272). As the cases are brought together, the pin(s) 272 may mate with or enter corresponding holes (not shown) formed in the interface 232a. In this respect, the pins 272 and corresponding holes may allow the cases 202 and 204 to be aligned just prior to them coming together.

Figure 3:
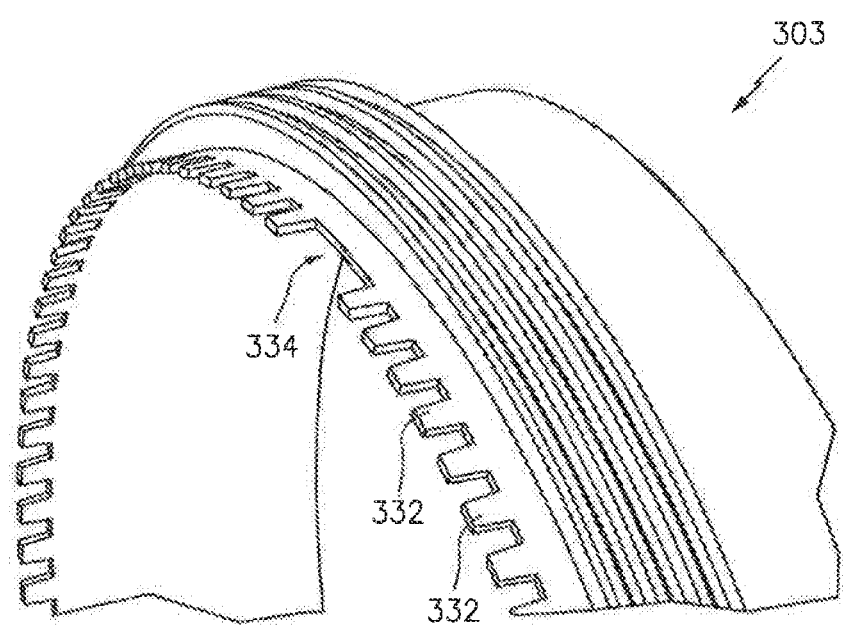
FIG. 3 illustrates a case incorporating an interface with a plurality of teeth and a region denoted by an absence of at least one teeth.

Referring now to FIG. 3, a case 303 is shown. The case 303 may correspond to the case 202 or the case 204. The case 303 may include a plurality of teeth 332 formed in an interface of the case 303. The interface may also include one or more regions 334 that are denoted by a missing/absent tooth. A counterpart case to the case 303 may be manufactured to include a tooth that is of a different size than the teeth 332 (e.g., a tooth that is larger in size than the teeth 332) that may be configured to mate/mesh with the region 334, thereby allowing the case 303 and the counterpart case to be aligned just prior to them coming together.

The embodiments shown in FIG. 2 (use of pin(s) 272) and FIG. 3 (use of missing tooth in region 334) may represent instances of interfaces incorporating male and female couplings.

Figure 4:
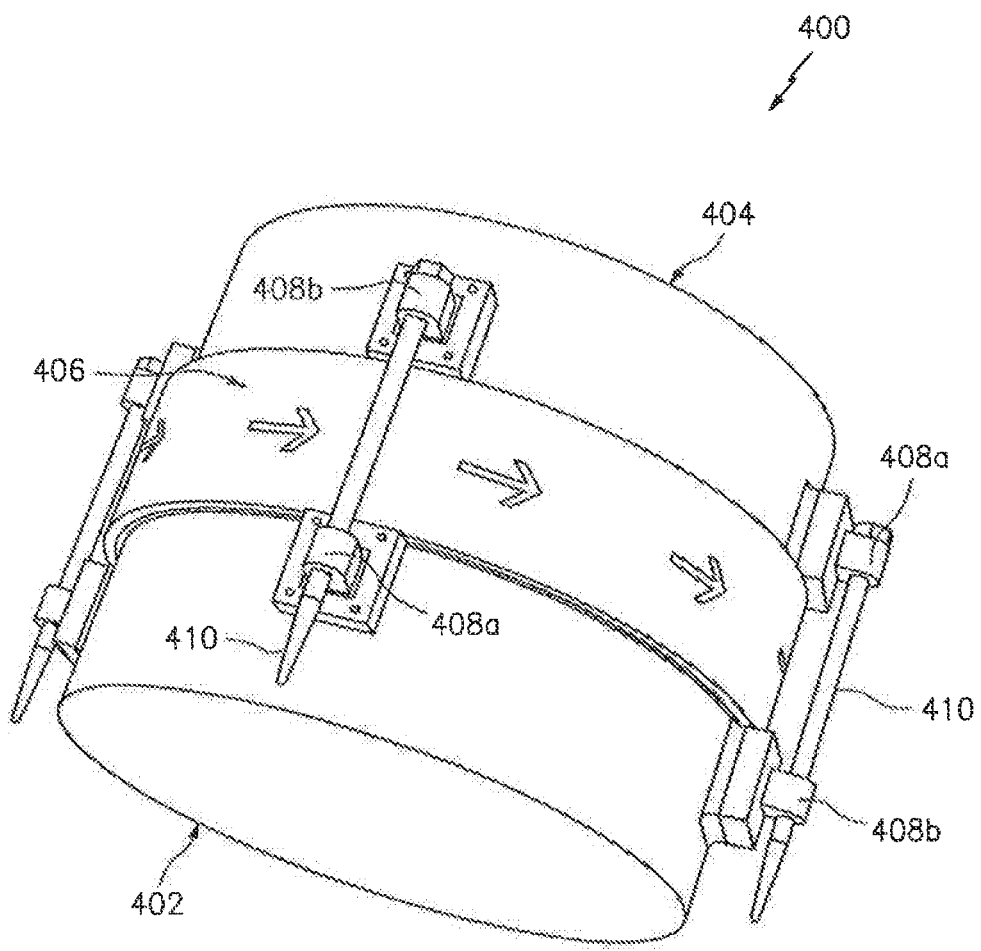
FIG. 4 illustrates a system for coupling two cases together using alignment pins and associated brackets.

Referring to FIG. 4, a system 400 is shown. The system 400 may include a first case 402 and a second case 404. A coupler 406 may be used to join or couple the cases 402 and 404 to one another. For example, in some embodiments the first case 402, the second case 404, or the coupler 406 may include threads for coupling the cases to one another via a torque applied to the coupler 406.

Associated with each of the cases 402 and 404 may be one or more brackets, such as brackets 408a associated with the case 402 and brackets 408b associated with the case 404. A pair of the brackets 408a and 408b may be configured to receive a pin 410. The pin 410 and its associated brackets 408a and 408b may be used to align the cases 402 and 404.

Figure 5:
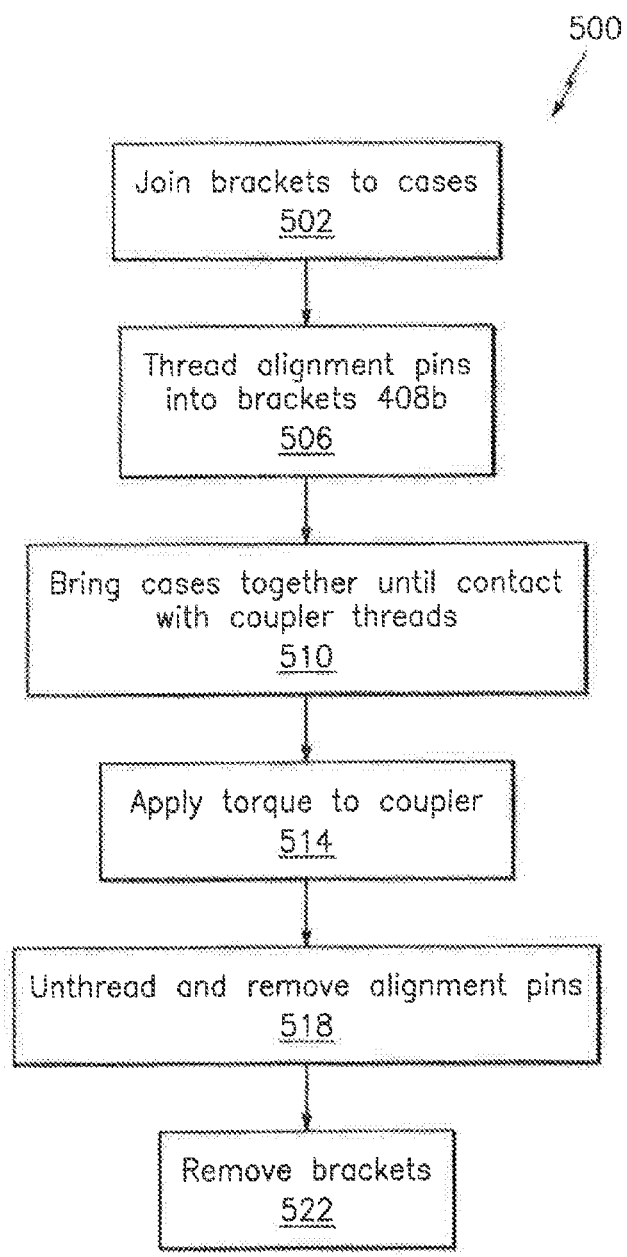
FIG. 5 illustrates a method for assembling the system of FIG. 4.

Referring to FIG. 5, a method 500 for assembling the system 400 is shown. The method 500 may start based on an assumption that the cases 402 and 404 are apart from one another.

In block 502, the brackets 408a and 408b may be joined to the cases 402 and 404, respectively. As part of block 502, the brackets 408a and 408b may be bolted onto the cases 402 and 404.

In block 506, the alignment pins 410 may be threaded into the brackets 408b.

In block 510, the cases 402 and 404 may be brought together until contact is made with threads of the coupler 406. The alignment pins 410 may engage with the brackets 408a prior to the contact being made with the threads.

In block 514, torque may be applied to the coupler 406 to draw the cases 402 and 404 together.

In block 518, the alignment pins 410 may be unthreaded and removed.

In block 522, the brackets 408a and 408b may be removed from the cases 402 and 404 (e.g., any bolts that may be used to secure the brackets in block 502 may be removed in block 522).

The blocks of the method 500 may execute in an order or sequence that is different from what is shown in FIG. 5. In some embodiments, one or more of the blocks may be optional. For example, blocks 518 and 522 may be executed to remove components/hardware from the system 400 once the cases 402 and 404 have been coupled to one another. Such removal may translate into a reduction in weight associated with an engine. However, in some embodiments the alignment pins 410 and the brackets 408a and 408b may be retained following a coupling of the cases 402 and 404.

Figure 6:
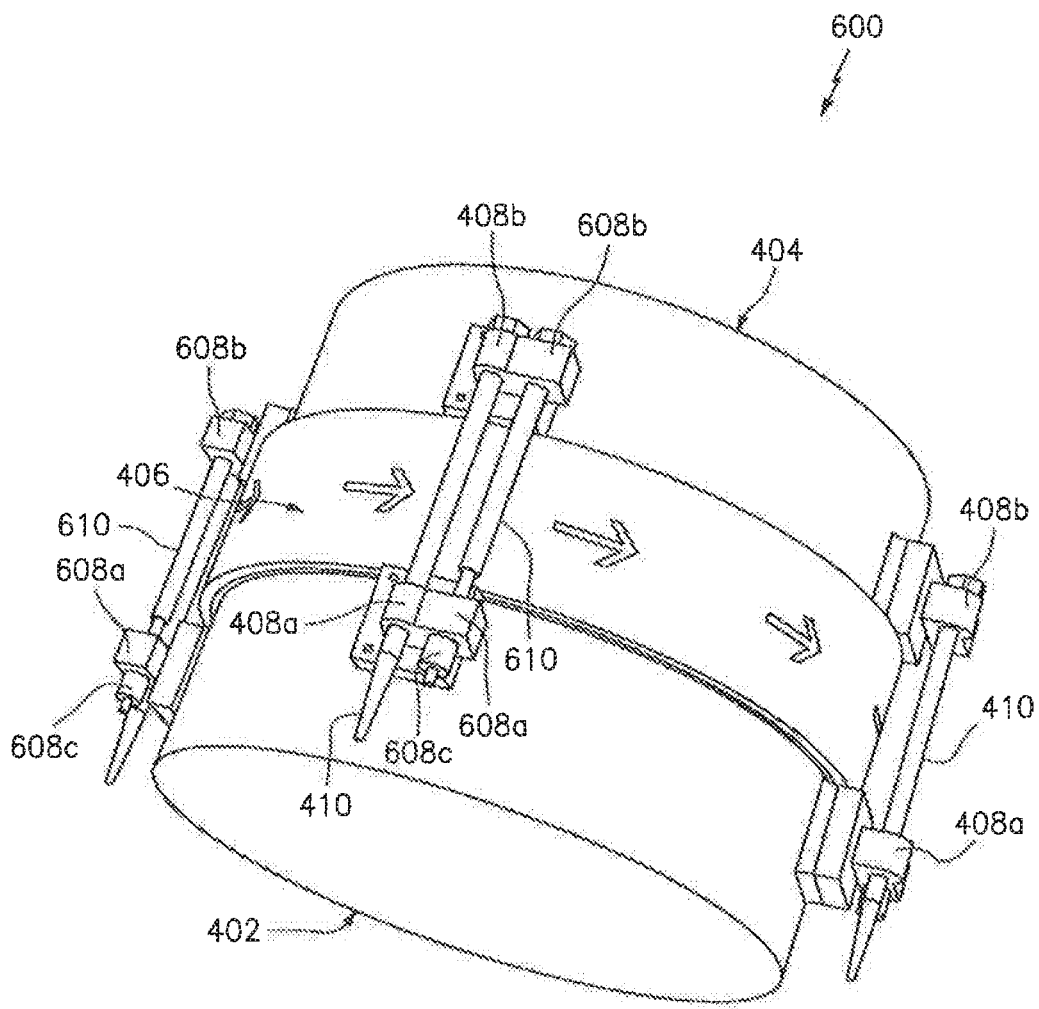
FIG. 6 illustrates a system for coupling two cases together using alignment and depth pins, brackets, and gauges.

Referring now to FIG. 6, a system 600 is shown. The system 600 is shown as including many of the same components and devices described above in connection with the system 400, and so, a complete re-description is omitted for the sake of brevity.

The system 600 may include one or more brackets 608a associated with the case 402 and one or more brackets 608b associated with the case 404. A pair of brackets 608a and 608b may be configured to seat or receive a pin 610. While the brackets 408a and 608a are illustrated as being separate components, in some embodiments, the brackets 408a and 608a may be integrally formed as a common piece/bracket. Similar remarks apply with respect to the brackets 408b and 608b.

Each of the pins 610 may be associated with a gauge 608c. Together, a set formed from a pin 610, a gauge 608c, and brackets 608a and 608b may provide for a fine adjustment (relative to the system 400) in terms of an alignment of the cases 402 and 404.

Figure 7A:
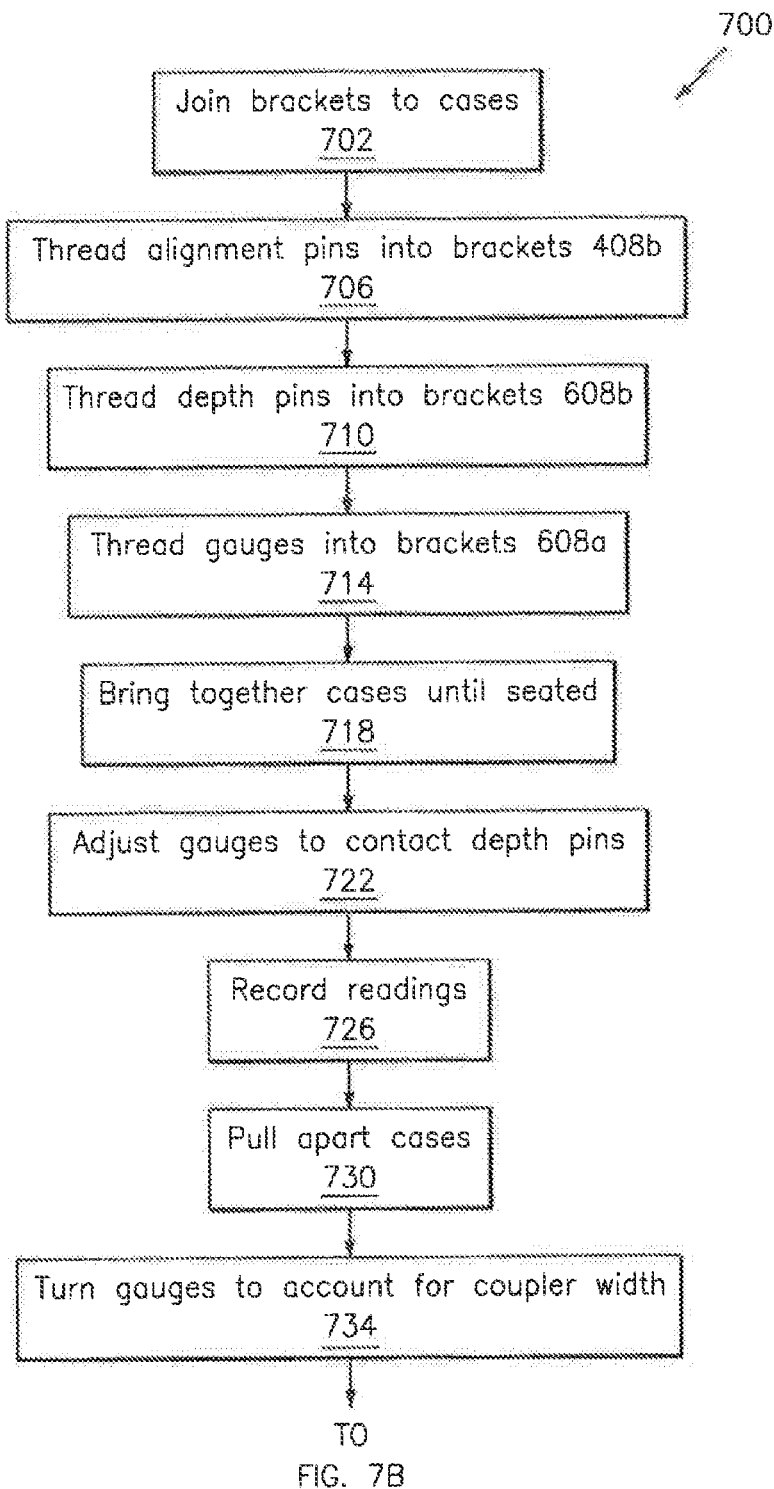
FIGS. 7A-7B illustrate a method for assembling the system of FIG. 6.
Figure 7B:
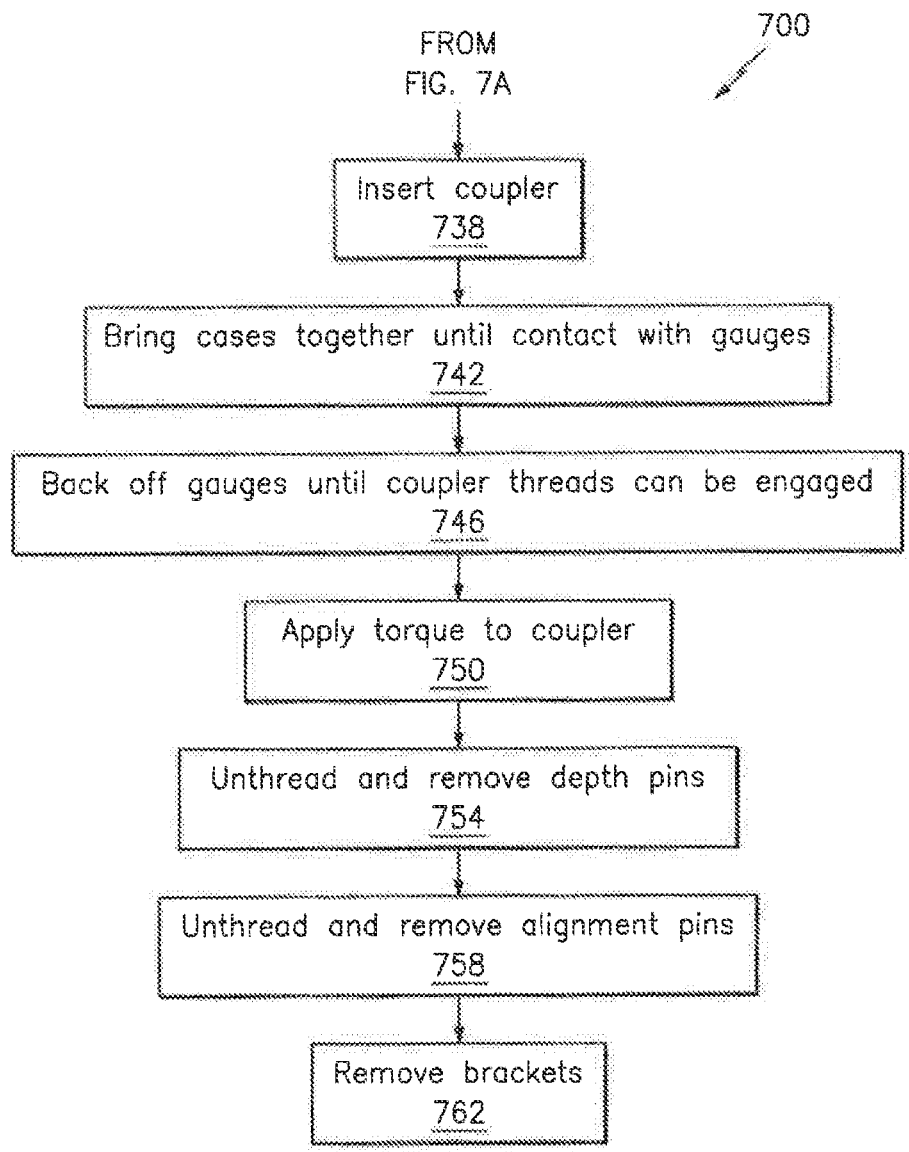

Referring to FIGS. 7A-7B (collectively referred to as FIG. 7), a method 700 for assembling the system 600 is shown. The method 700 may start based on an assumption that the cases 402 and 404 are apart from one another.

In block 702, the brackets (e.g., brackets 408a, 408b, 608a, 608b) may be joined to their respective cases 402 and 404. As part of block 702, the brackets may be bolted onto the cases 402 and 404.

In block 706, the alignment pins 410 may be threaded into the brackets 408b.

In block 710, the depth pins 610 may be threaded into the brackets 608b.

In block 714, the gauges 608c may be threaded into the brackets 608a.

In block 718, the cases 402 and 404 may be brought together until seated. As part of block 718, the coupler 406 might not be installed so that the teeth 332 may be visible. As such, it may be determined based on such visibility when the teeth 332 are engaged.

In block 722, the gauges 608c may be adjusted to contact the depth pins 610.

In block 726, readings associated with the gauges 608c (or analogously, the depth pins 610) may be recorded.

In block 730, the cases 402 and 404 may be pulled apart from one another.

In block 734, the gauges 608c may be turned (e.g., turned evenly with respect to one another) to account for the width of the coupler 406.

In block 738, the coupler 406 may be inserted/introduced.

In block 742, the cases 402 and 404 may be brought together until contact is made with the gauges 608c.

In block 746, the gauges 608c may be backed off (e.g., backed off evenly with respect to one another) until threads associated with the coupler 406 can be engaged. This backing off and threading may continue until the cases 402 and 404 are seated.

In block 750, torque may be applied to the coupler 406 to draw the cases 402 and 404 together. The cases may be drawn together until the gauges 608c match the recorded values in block 726.

In block 754, the depth pins 610 may be unthreaded and removed.

In block 758, the alignment pins 410 may be unthreaded and removed.

In block 762, the brackets may be removed from the cases 402 and 404 (e.g., any bolts that may be used to secure the brackets in block 702 may be removed in block 762).

The blocks of the method 700 may execute in an order or sequence that is different from what is shown in FIG. 7. In some embodiments, one or more of the blocks may be optional. For example, blocks 754-762 may be executed to remove components/hardware from the system 600 once the cases 402 and 404 have been coupled to one another in a manner similar to that described above with respect to the method 500.

Figure 8:
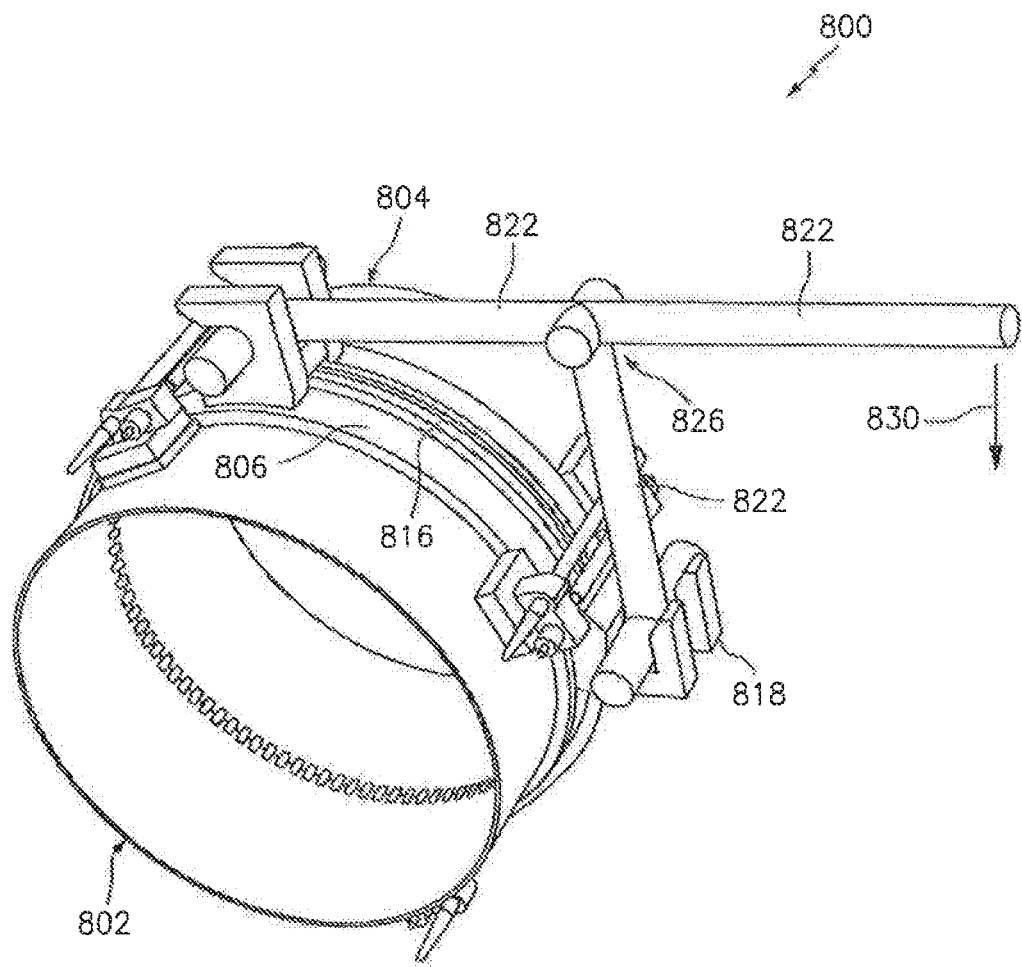
FIGS. 8-9 illustrate systems for applying torque to a coupler.

As described above, in some embodiments a torque may be applied to, e.g., a coupler, to couple two cases to one another. FIG. 8 illustrates a system 800 that may be used to couple a first case 802 and a second case 804 via a coupler 806. The coupler 806 may include a rail 816. At least one bracket 818 may be bolted to the rail 816. For example, the bracket 818 may include, or be associated with one or more bolts (e.g., one or more T-bolts).

The system 800 may include a number of levers/arms 822. In proximity to the reference character 826 there may be included a hinge, a slide, a joint, etc. At a distal end of one of the levers 822, as reflected via reference character 830), a torque may be applied (in a downward or clockwise direction as shown in FIG. 8) to cause a rotation of the coupler 806 to bring the cases 802 and 804 together.

Figure 9:
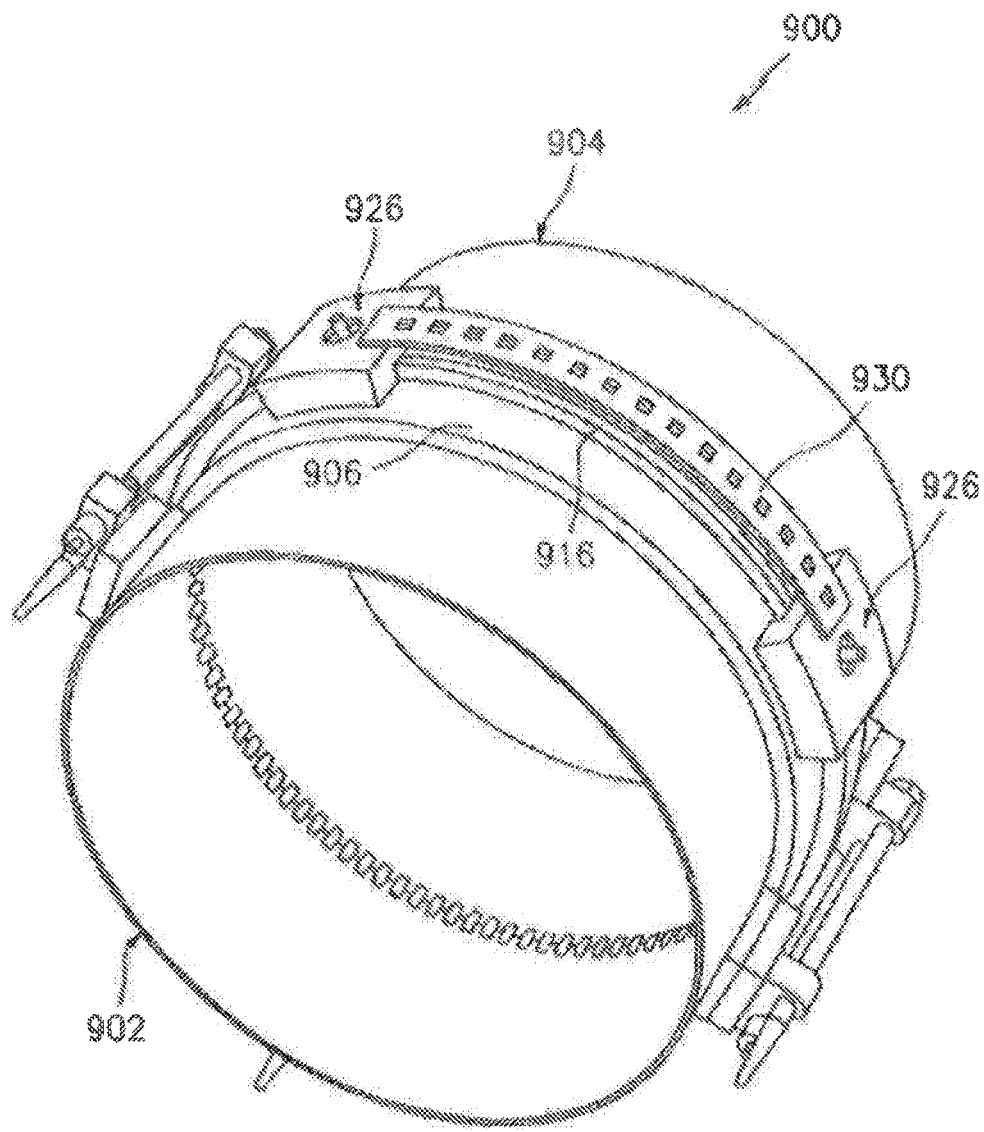

FIG. 9 illustrates a system 900 that may be used to apply torque to couple cases 902 and 904 to one another via a coupler 906. A rack 926 may be bolted to the coupler 906. A spur gear (not shown, but denoted via reference character 930) may mesh with the rack 926 to rotate the coupler 906. In some embodiments, one or more gear holes may be located on a side of a rail 916 of the coupler 906 or on the sides of the coupler 906 itself. In some embodiments, a first worm gear may be bolted to the coupler 906 and a second worm gear may be used to drive the torque.

Technical effects and benefits of this disclosure include an enhancement or extension of one or more component or device lifetimes as well as an ability to ensure a proper alignment or orientation of one or more cases prior to thread contact. In some embodiments, bosses located on cases may serve as attachment points for tooling and allows for tooling to be removed after assembly is completed. Options for applying torque to a coupler include one or more levers and a gear drive. Provisions for applying torque may be fastened to the coupler and removed upon completion of assembly. Aspects of the disclosure may be used to ensure that cases are aligned to enable threads to be started/engaged with minimal effort while simultaneously reducing risk to component integrity. In this respect, an interface may be configured to align a first case and a second case before threads of the cases are in an engaged state (before the threads of the cases engage with threads of a coupler).

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one of ordinary skill in the art will appreciate that the steps described in conjunction with the illustrative figures may be performed in other than the recited order, and that one or more steps illustrated may be optional in accordance with aspects of the disclosure.

What is claimed is:

1. A method for coupling cases associated with an engine of an aircraft, comprising:
    joining a first bracket with a first case and a second bracket with a second case;
    threading an alignment pin into the second bracket;
    bringing the first case and the second case together until contact is made with threads of a coupler, wherein the contact occurs subsequent to an engagement of the alignment pin with the first bracket; and
    applying torque to the coupler to cause the first case to couple to the second case.

2. The method of claim 1, further comprising:
    unthreading and removing the alignment pin from the first bracket and the second bracket subsequent to applying the torque; and
    removing the first bracket from the first case and the second bracket from the second case subsequent to the removal of the alignment pin.

3. The method of claim 1, wherein the joining of the first bracket with the first case includes bolting the first bracket to the first case.

4. The method of claim 1, further comprising:
    joining a third bracket with the first case and a fourth bracket with the second case; and
    threading a depth pin into the fourth bracket.

5. The method of claim 4, further comprising:
    threading a gauge into the third bracket.

6. The method of claim 5, further comprising:
    adjusting the gauge to contact the depth pin; and
    recording a reading associated with a depth based on the adjustment of the gauge.

7. The method of claim 6, further comprising:
    pulling apart the first case and the second case; and
    turning the gauge to account for a width of the coupler.

8. The method of claim 6, wherein the applied torque is based on the recorded reading.

* * * * *